United States Patent
Rajzer et al.

(10) Patent No.: US 12,095,402 B2
(45) Date of Patent: Sep. 17, 2024

(54) CONTROLLING A BRUSHLESS MOTOR

(71) Applicant: Snap-on Incorporated, Kenosha, WI (US)

(72) Inventors: Michael T. Rajzer, Kenosha, WI (US); Jason Genz, Kenosha, WI (US); Daniel Nitzsche, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/694,228

(22) Filed: Mar. 14, 2022

(65) Prior Publication Data

US 2022/0311364 A1    Sep. 29, 2022

Related U.S. Application Data

(60) Provisional application No. 63/165,894, filed on Mar. 25, 2021.

(51) Int. Cl.
*H02P 29/028* (2016.01)
*B25B 21/00* (2006.01)
(Continued)

(52) U.S. Cl.
CPC .............. *H02P 6/12* (2013.01); *B25B 21/004* (2013.01); *H02P 6/15* (2016.02); *H02P 6/16* (2013.01)

(58) Field of Classification Search
CPC .. H02P 29/028; H02P 6/12; H02P 6/16; H02P 6/15; B25B 21/004
(Continued)

(56) References Cited

U.S. PATENT DOCUMENTS

| | | | | |
|---|---|---|---|---|
| 4,758,768 A | * | 7/1988 | Hendricks | H02K 29/08 318/400.38 |
| 5,012,167 A | * | 4/1991 | Hendricks | H02P 6/14 318/400.06 |

(Continued)

FOREIGN PATENT DOCUMENTS

| | | |
|---|---|---|
| CN | 102347726 | 2/2012 |
| CN | 109256990 A | 1/2019 |

(Continued)

OTHER PUBLICATIONS

Taiwan Office Action for corresponding Application No. 11121026640 dated Oct. 21, 2022, 5 pages.

(Continued)

*Primary Examiner* — Gabriel Agared
(74) *Attorney, Agent, or Firm* — Taft Stettinius & Hollister LLP

(57) ABSTRACT

The present invention relates broadly to commutation control of a BLDC motor for use with, for example, a power tool. The method uses a controller to control a BLDC motor in the event of a position sensor failure. Rather than ceasing operation of the motor and indicating a fault or error message to the user, the present invention determines when the next transition should occur based on the time between past hall transitions using a timer. Thus, if one or two position sensors are no longer providing position information to the controller, the controller can determine when the transitions would be changing based on past transitions to continue controlling the motor and prevents the motor from ceasing operation.

11 Claims, 5 Drawing Sheets

(51) Int. Cl.
*H02P 6/12* (2006.01)
*H02P 6/15* (2016.01)
*H02P 6/16* (2016.01)

(58) Field of Classification Search
USPC .................................................. 318/400.13
See application file for complete search history.

(56) References Cited

U.S. PATENT DOCUMENTS

| | | |
|---|---|---|
| 6,918,688 B2 | 7/2005 | Ishida |
| 7,187,153 B2 | 3/2007 | Akira et al. |
| 7,227,353 B2 | 6/2007 | Fukaya et al. |
| 7,394,244 B2 | 7/2008 | Chapman et al. |
| 7,579,799 B2 | 8/2009 | Bugge et al. |
| 8,564,229 B2 | 10/2013 | Imoto et al. |
| 8,564,232 B2 | 10/2013 | Sato |
| 8,593,093 B2 | 11/2013 | Hisano et al. |
| 9,601,003 B2 | 3/2017 | Wichowski et al. |
| 9,742,322 B2 | 8/2017 | Rethinam et al. |
| 10,411,621 B2 | 9/2019 | Ajima et al. |
| 10,411,622 B2 | 9/2019 | Ikeda |
| 10,516,362 B2 | 12/2019 | Yamato |
| 2002/0014870 A1* | 2/2002 | Krotsch ............... H02P 6/14 318/400.23 |
| 2011/0089875 A1 | 4/2011 | Patel et al. |
| 2012/0280641 A1 | 11/2012 | Lejeune et al. |
| 2015/0137718 A1* | 5/2015 | Liu ..................... H02P 6/16 318/400.03 |
| 2016/0028334 A1 | 1/2016 | Greetham et al. |
| 2017/0012559 A1* | 1/2017 | Rethinam ............ H02P 6/14 |
| 2017/0019043 A1* | 1/2017 | Zhao ................... H02P 6/182 |
| 2017/0126154 A1 | 5/2017 | Shim et al. |
| 2017/0279387 A1* | 9/2017 | Kaidu ................. H02P 6/17 |

FOREIGN PATENT DOCUMENTS

| | | |
|---|---|---|
| CN | 110739887 A | 1/2020 |
| CN | 109687809 | 6/2020 |
| CN | 109698654 | 1/2021 |
| JP | 4131712 | 5/1992 |
| JP | 2007151266 | 6/2007 |
| JP | 2012116372 | 6/2012 |
| JP | 2012135097 | 7/2012 |
| JP | 6280852 | 2/2018 |
| KR | 20130065411 A | 6/2013 |
| WO | 2010133546 | 11/2010 |
| WO | 2019054089 | 3/2019 |
| WO | 2019054091 | 3/2019 |

OTHER PUBLICATIONS

Examination Report No. 1 for corresponding Australian Application No. 2022201946 dated Mar. 21, 2023, 8 pages.
Combined Search and Examination Report for corresponding Application No. GB2203881.4 dated Sep. 30, 2022, 6 pages.
Combined Search and Examination Report for corresponding Application No. GB2304460.5 dated Jul. 14, 2023, 4 pages.
Canadian Office Action for corresponding Application No. 3,152,804 dated Sep. 12, 2023, 3 pages.
Canadian Patent Office, Examination Report issued in corresponding Application No. 3,152,804, dated May 22, 2024, 5 pp.

* cited by examiner

CONTROLLING A BRUSHLESS MOTOR

CROSS REFERENCES TO RELATED APPLICATIONS

This application claims the benefit of U.S. Provisional Patent Application Ser. No. 63/165,894, filed Mar. 25, 2021, the contents of which are incorporated herein by reference in their entirety.

TECHNICAL FIELD OF THE INVENTION

The present invention relates to electric motors, and more particularly to control of a brushless DC (BLDC) motor.

BACKGROUND OF THE INVENTION

Power tools, such as, for example, motorized ratchet wrenches, drills, and drivers, driven by brushless DC (BLDC) motors are commonly used in automotive, industrial, and household applications to tighten and untighten work pieces, such as threaded fasteners, and to apply a torque and/or angular displacement to a work piece, for example. BLDC motor commutation is typically implemented using a microcontroller or microprocessor computer. Controlling commutation with electronics and position feedback instead of brushes allows greater flexibility and capabilities not available with conventional brushed DC motors, including precise speed control, position control, and stepped operation for slow and fine motion control.

Many different techniques of commutation of three-phase brushless direct current (BLDC) motors are currently used. Typically, the commutation is controlled based on a position of a rotor of the motor. The position of the rotor is detected by sensors, such as, for example, Hall-effect sensors. The microcontroller or microprocessor computer then controls high and low side switches of the respective phases in a particular sequence to control the motor according to a commutation scheme, such as, for example, a six-step commutation. For example, in a three-phase brushless DC motor, three position sensors are located 60 or 120 degrees apart about the motor shaft and have six transition points (i.e., three sensors each actuating between high and low in response to the position of the rotor). However, since the position sensors are connected to a separate controller board outside the motor with wires, there is a risk that one or more of the wired connections could experience electrical noise or get pinched, cut, or damaged in some way due to manufacturing errors or by vibration caused by operating the motor. If the controller cannot detect the position of the rotor, the controller cannot control the motor properly, which results in the motor ceasing operation and indicating a fault or error message to the user. For example, if one position sensor is damaged, the controller will only detect four transitions (i.e., two sensors each going high and low). If two position sensors are damaged, the controller will only detect two transitions (i.e., one sensor going high and low).

SUMMARY OF THE INVENTION

The present invention relates broadly to commutation control of a BLDC motor for use with, for example, a power tool. While the present invention is described as being used with a BLDC motor for a power tool, it will be appreciated that the present invention can be used with a BLDC motor for any purpose or function. The invention uses a controller to control a BLDC motor in the event of a position sensor failure. Rather than ceasing operation of the motor and indicating a fault or error message to the user, the present invention determines when the next transition should occur based on the time between past Hall sensor transitions using a timer. For example, if the time between the two previous transitions was 10 microseconds, the controller will determine that the next transition should be in 10 microseconds as well. Thus, if one or two position sensors are no longer providing position information to the controller, the controller can determine when the transitions would be changing based on past transitions to continue controlling the motor and prevents the motor from ceasing operation.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
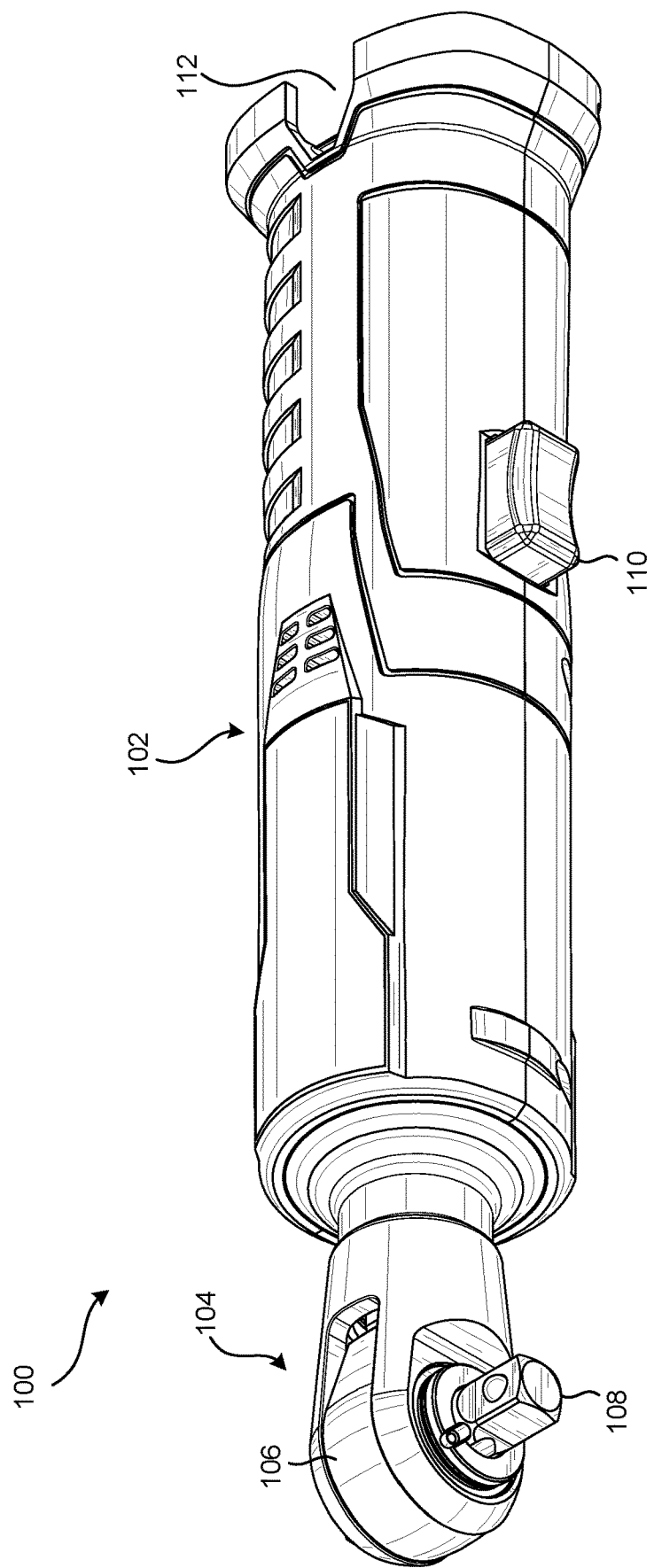
FIG. 1 is a perspective view of an exemplary power tool, such as a motorized ratchet tool, incorporating an embodiment of the present invention.
Figure 2:
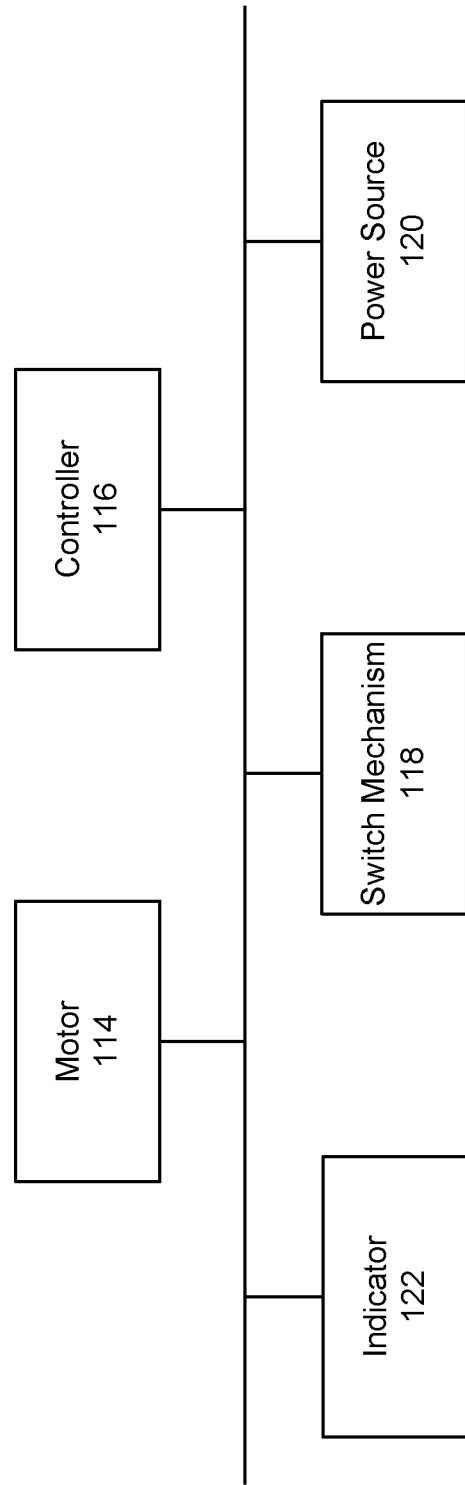
FIGS. 2 and 3 are block component diagrams of electronic components of an exemplar tool incorporating embodiments of the present invention.
Figure 3:
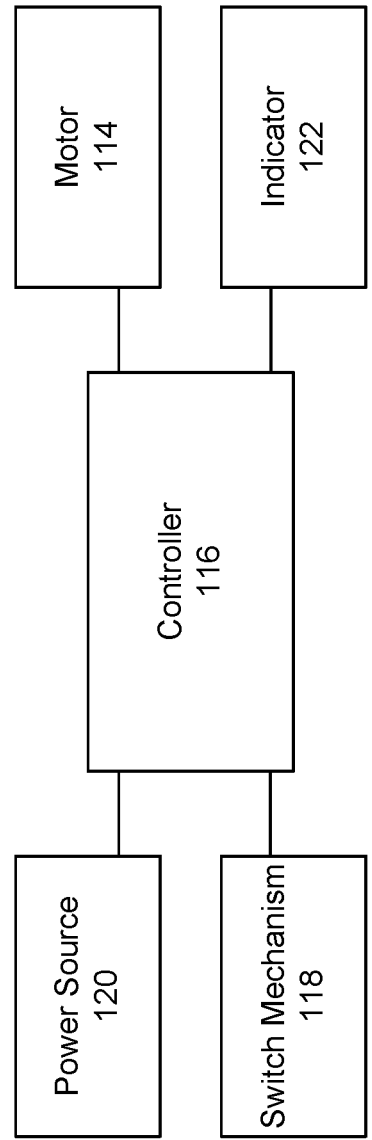

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to commutation control of a BLDC motor for use with, for example, a power tool. While the present invention is described as being used with a BLDC motor for a power tool, it will be appreciated that the present invention can be used with a BLDC motor for any purpose or function. The invention uses a controller to control a BLDC motor in the event of a position sensor failure. Rather than ceasing operation of the motor and indicating a fault or error message to the user, the present invention determines when the next transition should occur based on the time between past Hall sensor transitions using a timer. For example, if the time between the two previous transitions was 10 microseconds, the controller will determine that the next transition should be in 10 microseconds as well. Thus, if one or two position sensors are no longer providing position information to the controller, the controller can nonetheless determine when the transitions would be changing based on past transitions to continue controlling the motor, and thus prevents the motor from ceasing operation.

Referring to FIGS. 1-5, an exemplar tool 100 that can incorporate or use one or more embodiments of the present invention, such as a cordless ratchet-type tool, includes a main tool housing 102 and output assembly 104 (such as a ratchet head assembly). The tool housing 102 may include first and second housing portions that are coupled together in a clamshell type manner and securely coupled to the output assembly 104. The tool housing 102 may enclose or house a BLDC motor 114 (shown in FIGS. 2 and 3), controller 116 (shown in FIGS. 2 and 3), a switch assembly 118 (shown in FIGS. 2 and 3), display with buttons for configuring and setting the tool, one or more indicators 122 such as light emitting diodes, and other components for operation of the tool, for example. The tool housing 102 may also include a textured or knurled grip to improve a user's grasp of the tool 100 during use.

The output assembly 104 includes a drive portion 106 including a drive lug 108, for example. The drive lug 108 is adapted to apply torque to a work piece, such as a fastener, via an adapter, bit, or socket coupled to the drive lug 108, such as a bi-directional ratcheting square or hexagonal drive. As illustrated, the drive lug 108 is a "male" connector designed to fit into or matingly engage a female counterpart, such as a socket, for example. However, the drive portion 106 may alternatively include a "female" connector designed to matingly engage a male counterpart. The drive portion 106 may also be structured to directly engage a work piece without requiring coupling to an adapter, bit, or socket. The rotational direction of the drive portion 106/drive lug 108 can be selected by rotation of a selector switch to be either a first or second rotational direction (such as, clockwise or counterclockwise).

The tool 100 may also include a trigger 110 that can be actuated by a user to selectively cause the tool 100 to operate. For example, the user can depress the trigger 110 inwardly to selectively cause power to be drawn from a power source 120 and cause the motor 114 to provide torque to the output assembly 104 and cause the drive lug 108 to rotate in a desired rotational direction. The trigger 110 may also be operably coupled to a switch mechanism 118 that is adapted to cause power to be supplied from the power source 120 to the motor 114 when the trigger 110 is actuated. Any suitable trigger 110 or switch can be implemented without departing from the spirit and scope of the present invention. For example, the trigger 110 may also be biased such that the trigger 110 is inwardly depressible, relative to the tool 100, to cause the tool 100 to operate, and a release of the trigger 110 causes the trigger 110 to move outwardly, relative to the tool 100, to cease operation of the tool 100 via the biased nature of the trigger 110. The trigger 110 and switch mechanism 118 may also be a variable speed type mechanism. In this regard, actuation or depression of the trigger 110 causes the motor to operate at a faster speed the further the trigger 110 is depressed.

The motor 114 may be disposed in the tool housing 102 and be adapted to operably engage the output assembly 104, and provide torque to the tool 100 and, in turn, to drive portion 106/drive lug 108. The motor 114 may be a three-phase BLDC motor. A power source 120 can be associated with the tool 100 to provide electronic power to the tool 100 to operate the motor and other components. In an embodiment, the power source 120 can be housed in an end 112 of the tool housing 102, opposite the output assembly 104, a midsection of the tool 100, or any other portion of the tool 100/tool housing 102. The power source 120 may also be an external component that is not housed by the tool 100, but that is operatively coupled to the tool 100 through, for example, wired or wireless means. In an embodiment, the power source 120 is a removable and rechargeable battery that is adapted to be disposed in the end of the tool housing 102 and electrically couple to corresponding terminals of the tool 100.

The controller 116 may be operably coupled to one or more of the power source 120, switch mechanism 118, indicator 122, and the motor 114. The controller 116 may include a central processing unit (CPU) for processing data and computer-readable instructions, and a memory for storing data and instructions. The memory may include volatile random access memory (RAM), non-volatile read only memory (ROM), and/or other types of memory. A data storage component may also be included, for storing data and controller/processor-executable instructions (for example, instructions for the operation and functioning of the tool 100). The data storage component may include one-or-more types of non-volatile solid-state storage, such as flash memory, read-only memory (ROM), magnetoresistive RAM (MRAM), ferroelectric RAM (FRAM), phase-change memory, etc.

Computer instructions for operating the tool 100 and its various components may be executed by the controller 116, using the memory as temporary "working" storage at runtime. The computer instructions may be stored in a non-transitory manner in non-volatile memory, storage, or an external device. Alternatively, some of the executable instructions may be embedded in hardware or firmware in addition to or instead of in software.

For example, the controller 116 may implement of the methods described herein. A position of the rotor of the motor 114 can be determined by the controller 116 from signals received from position sensors, for example, Hall-effect sensors, using known methods. However, the present invention is not limited as such and any suitable arrangement of electronic components may be used to determine the position of the rotor of the motor 114. In the event of a position sensor signal failure, the controller 116 controls commutation based on an estimated position of the rotor using the method described below.

Figure 4:
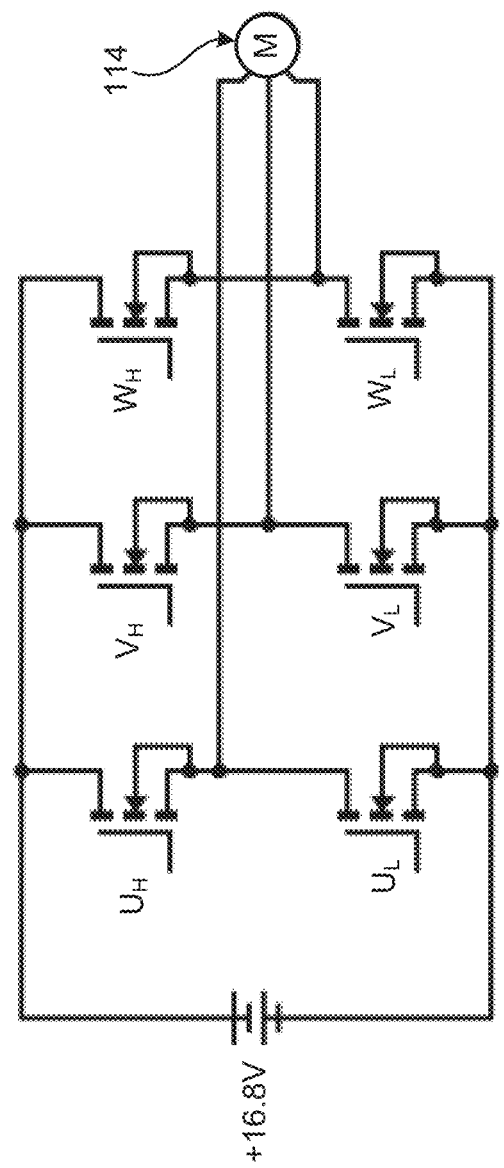
FIG. 4 is a schematic of an exemplar BLDC motor incorporating an embodiment of the present invention.

An example switching array for the motor 114 of the tool 100 is illustrated in FIG. 4. The first (U), second (V), and third (W) phases respectively include high-side switching elements, $U_H$, $V_H$, and $W_H$, and low-side switching elements, $U_L$, $V_L$, and $W_L$. In an embodiment, the switching elements are metal-oxide semiconductor field-effect transistors (MOSFETs). The switching elements are actuatable by the controller 116 to selectively apply power from a power source 120 (e.g., a battery) to the motor 114 to achieve desired commutation based on a position of the rotor relative to the stator of the motor. By selectively activating particular high-side and low-side switching elements, the motor 114 is operated by having the controller 116 send a current signal through coils located on the stator. The coils cause a magnetic force to be applied to the rotor, which rotates when current runs through the coils. The rotor contains permanent magnets that interact with the magnetic forces created by windings of the stator. Position sensors, such as, for example, Hall-effect sensors, are used to detect the position of the permanent magnets of the rotor to determine the position of the rotor relative to the stator. By activating successive combinations of high-side and low-side switching elements in a particular order based on the position of the rotor, thereby sending a particular order of current signals through the windings of the stator, the stator creates a rotating magnetic field that interacts with the rotor causing it to rotate and generate torque.

Figure 5:
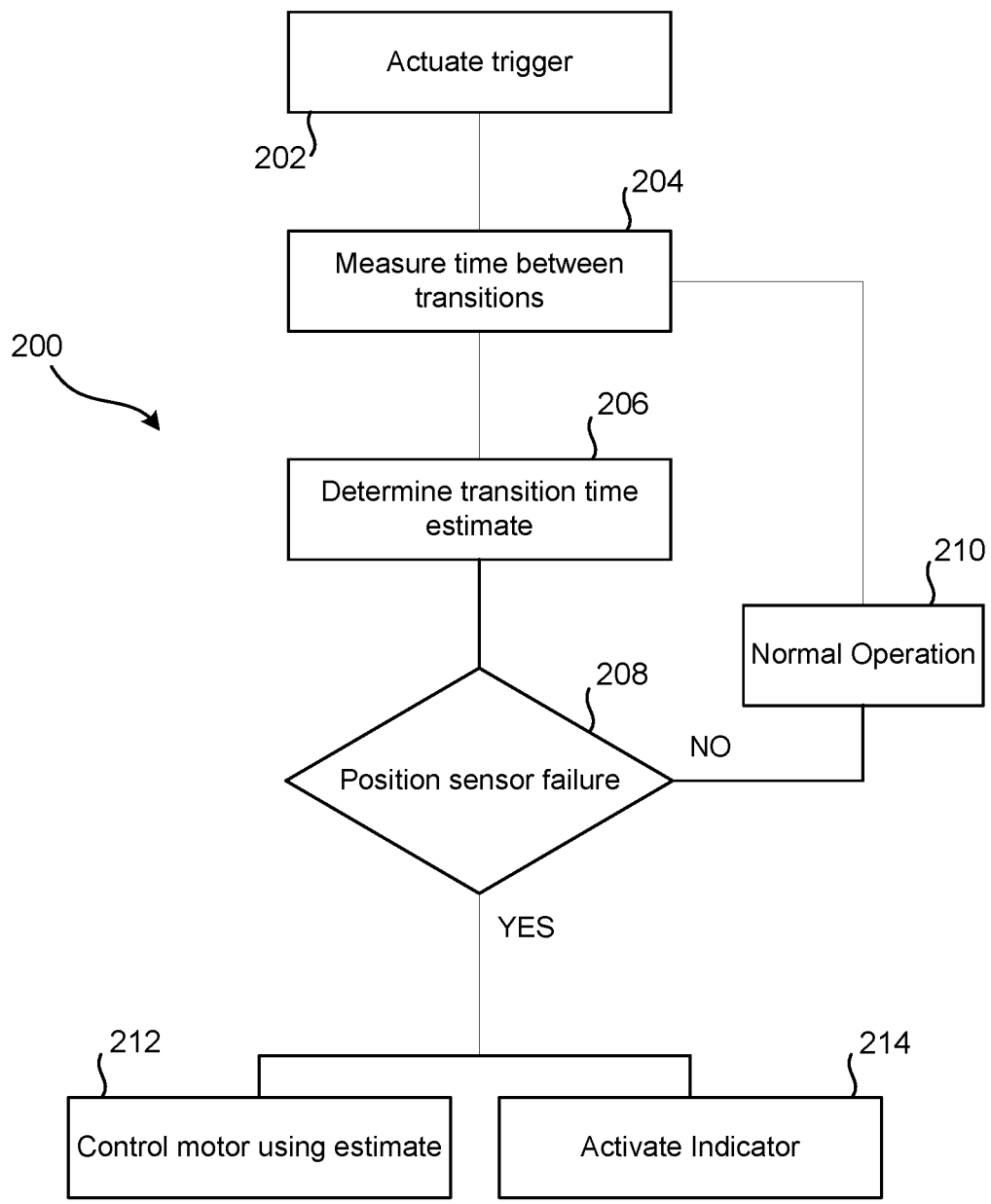
FIG. 5 is a chart illustrating an exemplary method of control of a BLDC motor, according to an embodiment of the present invention.

FIG. 5 is block flow diagram of an example method performed by a computing device, such as the controller 114, to control the high-side switching elements, $U_H$, $V_H$, and $W_H$, and low-side switching elements, $U_L$, $V_L$, and $W_L$ to achieve desired commutation in the event of a position sensor failure. In the first step, the trigger 110 is actuated to cause the tool 100 to operate, illustrated as block 202. Once the trigger is actuated, the tool (such as via controller 116) measures the amount of time that passes between transition points using the received position sensor signals (i.e., the position sensors switching between high and low (also referred to as first and second states) in response to the position of the rotor, and to indicate a position of the rotor), illustrated as block 204. A software based timer may be used to measure the time between transition points (i.e., the time between the switch between high and low (first and second states) of each position sensor). The tool (such as via controller 116) determines a transition time estimate based on the measured amount of time to estimate when the next transition point should occur, illustrated as block 206. For example, the estimate may be based on a previous measured transition time or an average of the measured transition times. The tool (such as via controller 116) determines if position sensors are operating, illustrated as block 208. When the position sensors are functioning properly, the tool (such as via controller 116) continues normal operation, illustrated as block 210, and continues to measure time between transition points and determine a transition time estimate until the trigger is released. When one or more of the position sensors fail, the tool (such as via controller 116) controls the motor using the transition time estimate, illustrated as block 212, and may also activate the indicator, illustrated as block 214, until the trigger is released. In an embodiment, when one of the position sensors fail, the tool (such as via controller 116) keeps the same set of switching elements activated until another position sensor transition occurs. If the position sensor transition does not occur for a predetermined amount of time, the controller 116 activates the indicator to indicate a fault and controls the motor using the transition time estimate. For example, the controller 116 activates one or more of switching elements to control commutation, and receives signals from the position sensors respectively corresponding to transitions between first and second states of the position sensor. When on or more of the position sensors fail, the controller causing the one or more of the switching elements to remain active, and indicates a fault when a signal from the position sensor(s) is not received within a predetermined amount of time. Accordingly, the controller 116 is able to control the high-side switching elements, $U_H$, $V_H$, and $W_H$, and low-side switching elements, $U_L$, $V_L$, and $W_L$ to achieve desired commutation in the event of a position sensor failure to allow the motor 114 to continue operating normally and maintain the same speed and torque.

As discussed herein, the exemplar tool 100 is a ratchet-type wrench. However, the tool 100 can be any type of hand-held tool, including, without limitation, electrically powered or motorized tools, such as a drill, router, or impact wrench, ratchet wrench, screwdriver, or other powered tool, that is powered by electricity via an external power source (such as a wall outlet and/or generator outlet) or a battery. Moreover, it will be appreciated that the present invention is not limited to use with power hand-held tools, but can be used with any devices that utilize BLDC motors.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method for controlling commutation of a brushless DC (BLDC) motor having a rotor and a position sensor, the method comprising:
   receiving signals from the position sensor respectively corresponding to transitions between first and second states of the position sensor, wherein the signals are used to indicate a position of the rotor;
   respectively measuring amounts of time between successive transitions, thereby respectively creating measured amounts of time;
   determining a transition time estimate based on the measured amounts of time;
   determining that a position sensor failure occurs when a signal is not received within a predetermined amount of time; and
   controlling commutation of the rotor using the transition time estimate when the position sensor failure occurs.

2. The method of claim 1, further comprising activating an indicator when the position sensor failure occurs.

3. The method of claim 1, wherein the transition time estimate is based on an average of the measured amounts of time.

4. A tool including a brushless DC (BLDC) motor having a rotor and a position sensor, comprising:
   a controller adapted to:
      receive signals from the position sensor respectively corresponding to transitions between first and second states of the position sensor, wherein the signals are used to indicate a position of the rotor;
      respectively measuring amounts of time between successive transitions, thereby respectively creating measured amounts of time;
      determine a transition time estimate based on the measured amounts of time;
      determine that a position sensor failure occurs when a signal is not received within a predetermined amount of time; and
      control commutation of the rotor using the transition time estimate when the position sensor failure occurs.

5. The tool of claim 4, wherein the controller is further adapted to activate an indicator when the position sensor failure occurs.

6. A tool including an output and a brushless DC (BLDC) motor adapted to drive the output, comprising:

a first position sensor adapted to indicate a position of a rotor of the motor, wherein the first position sensor transitions between first position sensor first and second states; and a controller adapted to:
receive a first signal from the first position sensor corresponding to a first position sensor first transition between the first position sensor first and second states;
receive a second signal from the first position sensor corresponding to a first position sensor second transition between the first position sensor first and second states;
measure a first amount of time between the first position sensor first and second transitions;
determine a first transition time estimate based on the measured first amount of time;
determine that a first position sensor failure occurs when at least one of the first and second signals is not received within a predetermined amount of time; and
control commutation of the motor using the first transition time estimate when the first position sensor failure occurs.

7. The tool of claim 6, further comprising an indicator, wherein the controller is further adapted to activate the indicator when the first position sensor failure occurs.

8. The tool of claim 6, further comprising a second position sensor, wherein the second position sensor transitions between second position sensor first and second states; and wherein the controller is further adapted to:
receive a first second position sensor signal from the second position sensor corresponding to a second position sensor first transition between the second position sensor first and second states of the second position sensor; and
receive a second position sensor second signal from the second position sensor corresponding to a second position sensor second transition between the second position sensor first and second states of the second position sensor.

9. The tool of claim 8, wherein the controller is further adapted to:
measure a second amount of time between the second position sensor first and second transitions; and
determine a second transition time estimate based on the measured second amount of time.

10. The tool of claim 9, wherein the controller is further adapted to control commutation of the motor using the second transition time estimate when a second position sensor failure occurs.

11. The tool of claim 10, further comprising an indicator, wherein the controller is further adapted to activate the indicator when the second position sensor failure occurs.

* * * * *